(12) United States Patent
Ito et al.

(10) Patent No.: US 7,718,252 B2
(45) Date of Patent: May 18, 2010

(54) INORGANIC FIBER ARTICLE

(75) Inventors: Yasutaka Ito, Ibi-gun (JP); Tsutomu Sato, Ogaki (JP)

(73) Assignee: Ibiden Co., Ltd., Ogaki-shi (JP)

( * ) Notice: Subject to any disclaimer, the term of this patent is extended or adjusted under 35 U.S.C. 154(b) by 0 days.

(21) Appl. No.: 11/668,188

(22) Filed: Jan. 29, 2007

(65) Prior Publication Data

US 2007/0196652 A1 Aug. 23, 2007

(30) Foreign Application Priority Data

Feb. 13, 2006 (JP) .............................. 2006-035798

(51) Int. Cl.
*B32B 5/20* (2006.01)
*C04B 38/10* (2006.01)

(52) U.S. Cl. .............. 428/309.9; 428/312.2; 428/312.6; 428/312.8; 428/314.4; 428/314.8; 501/80; 501/84

(58) Field of Classification Search .............. 428/312.2, 428/312.6, 312.8, 316.6, 319.1, 309.9, 314.4, 428/314.8; 501/80, 84
See application file for complete search history.

(56) References Cited

U.S. PATENT DOCUMENTS 3,630,764 A * 12/1971 Shannon .................. 106/18.11
4,732,879 A * 3/1988 Kalinowski et al. ............ 502/5
5,451,465 A * 9/1995 Garrioch ...................... 428/426
6,964,809 B2 * 11/2005 Hojaji et al. .............. 428/318.8
2005/0031844 A1 * 2/2005 Wang ....................... 428/304.4
2005/0031942 A1 * 2/2005 Hennige et al. ............. 429/144

FOREIGN PATENT DOCUMENTS

| DE | 42 15 468 A1 | 11/1993 |
| DE | 197 50 769 A1 | 5/1999 |
| EP | 0 547 018 A | 6/1993 |
| JP | 4-275951 | 10/1992 |
| JP | 05-018042 | 1/1993 |
| JP | 7-60037 | 3/1995 |
| JP | 2000-86361 | 3/2000 |
| JP | 3606744 | 1/2005 |

OTHER PUBLICATIONS

English Abstract of KR 2005041090, Kim et al, May 4, 2005.*
Nashimoto et al., Database WPI Week 199518, Thomson Scientific, London, GB; AN 1995-136027, XP-002565563.

* cited by examiner

*Primary Examiner*—Hai Vo
(74) *Attorney, Agent, or Firm*—Oblon, Spivak, McClelland, Maier & Neustadt, L.L.P.

(57) ABSTRACT

The inorganic fiber article according to the present invention is an inorganic fiber article comprising an inorganic coating layer having foams, the inorganic coating layer formed on at least a portion of the surface of an inorganic fiber molded body.

19 Claims, 2 Drawing Sheets

INORGANIC FIBER ARTICLE

CROSS-REFERENCE TO RELATED APPLICATIONS

This application claims priority of JP-A 2006-035798 filed on Feb. 13, 2006. The contents of this application are incorporated herein by reference in their entirety.

BACKGROUND OF THE INVENTION

1. Field of the Invention

The present invention relates to an inorganic fiber article.

2. Discussion of the Background

Solar batteries are manufactured by forming transistors and the like on a Si substrate as a starting material. Therefore, a heating treatment is normally applied to the Si substrate several times. Moreover, a conveyer for conveying the Si substrate is provided inside the furnace for heating treatment, and a heat insulating material is also provided such that it surrounds the conveyer in order to reduce heat energy loss.

Here, with respect to the heat insulating material, for example, there has been used a plate shaped body manufactured through the following processes: first, a slurry is produced by mixing and dispersing a ceramic fiber, an inorganic binder, a fiber coagulant, and fiber flocculants, and using this slurry, a wet-type sheet forming process is carried out to form an aggregate; next, the aggregate is pressed and compressed in the thickness direction to manufacture the plate shaped body.

In the method for manufacturing the solar battery, wiring and the like are directly produced on the Si substrate; therefore, the cleanness of the surface of the Si substrate is under extremely strict requirements. Moreover, several kinds of heating treatments are necessarily carried out on the Si substrate. The several heating treatments on the Si substrate employs a furnace, and as a matter of course, extremely strict conditions are also imposed on the particle generation from the heat insulating material that forms the inner wall and the tray of the furnace.

This is because, if the particle scattering from the heat insulating material that forms the inner wall and the tray of the furnace adheres to the surface of the Si substrate during the several heating treatments, this becomes a serious cause of generating defective circuits. Such particle generation from the heat insulating material have been one of the causes for producing defective products in processes such as a process for forming a semiconductor circuit on substrates such as a glass substrate and a ceramic substrate, a process for manufacturing a display substrate, and manufacturing processes carried out in a chip-manufacturing equipment.

Thus, in order to lower the particle generation from the heat insulating material, JP-B 3606744 discloses, as shown in FIG. 2, for example, a heat resistant material 11 formed of a base member 13 which is made in contact with a glass layer 12 as shown in FIG. 2, the base member 13 mainly composed of an inorganic fiber based material 14 and containing an inorganic particle 15, the glass layer 12 obtained through carrying out heating treatment on a glass material-containing base member mainly composed of glass material. The base member further contains as a binder a glass 16 obtained through carrying out heating treatment on the above-mentioned glass material, and the glass layer 12 contains the inorganic fiber based material 14 as a reinforcing material.

The contents of JP-B 3606744 are incorporated herein by reference in their entirety.

SUMMARY OF THE INVENTION

An inorganic fiber article according to the embodiments of the present invention comprises an inorganic coating layer having foams, the inorganic coating layer formed on at least a portion of the surface of an inorganic fiber molded body.

The inorganic coating layer is desirably formed on the entire surface of one of the faces forming the outer shape of the inorganic fiber molded body.

It is desirable that the inorganic coating layer mainly comprise an amorphous material.

It is desirable that the amorphous material be at least one amorphous material selected from the group consisting of glass, a diamond-like carbon, a silicon oxide film, a hafnium oxide film, a chalcogenide based multi-element alloy, and an opaline material, and particularly, the amorphous material is desirably glass.

The inorganic coating layer desirably contains at least one crystalline material selected from the group consisting of carbide crystals, nitride crystals, oxide crystals, and carbon crystals. The crystalline material is desirably carbide crystals or carbon crystals, and particularly, the carbide crystals are silicon carbide, titanium carbide, iron carbide, vanadium carbide, chromium carbide, or molybdenum carbide.

It is desirable that at least a portion of the foams be closed pores.

A water permeability from the outwardly-exposed surface side to the inorganic fiber molded body side of the inorganic coating layer is desirably about 1% or less.

Moreover, the inorganic coating layer has a thickness of at least about 0.4 mm and at most about 5 mm.

The diameter of each of the foams is desirably about 90% or less with respect to the thickness of the inorganic coating layer.

The inorganic coating layer desirably contains about 30% by weight or more of silica, and has a coefficient of thermal expansion of about 6 ppm or less.

An inorganic fiber forming the inorganic fiber molded body is desirably a silica-alumina fiber, an alumina fiber, a silica fiber, a zirconia fiber, a glass fiber, a potassium titanate whisker fiber, a rock wool, or an inorganic fiber that contains any of the aforementioned inorganic fibers in addition to at least one compound selected from the group consisting of an alkali metal compound, an alkaline earth compound and a boron compound.

The inorganic fiber molded body desirably comprises an inorganic powder, and the inorganic powder is desirably a $TiO_2$ powder, a $BaTiO_3$ powder, a PbS powder, a $SiO_2$ powder, a $ZrO_2$ powder, a SiC powder, a NaF powder, a LiF powder, or a combination of two or more of these powders.

The inorganic fiber molded body desirably comprises an inorganic binder.

DESCRIPTION OF THE EMBODIMENTS

Figure 1:
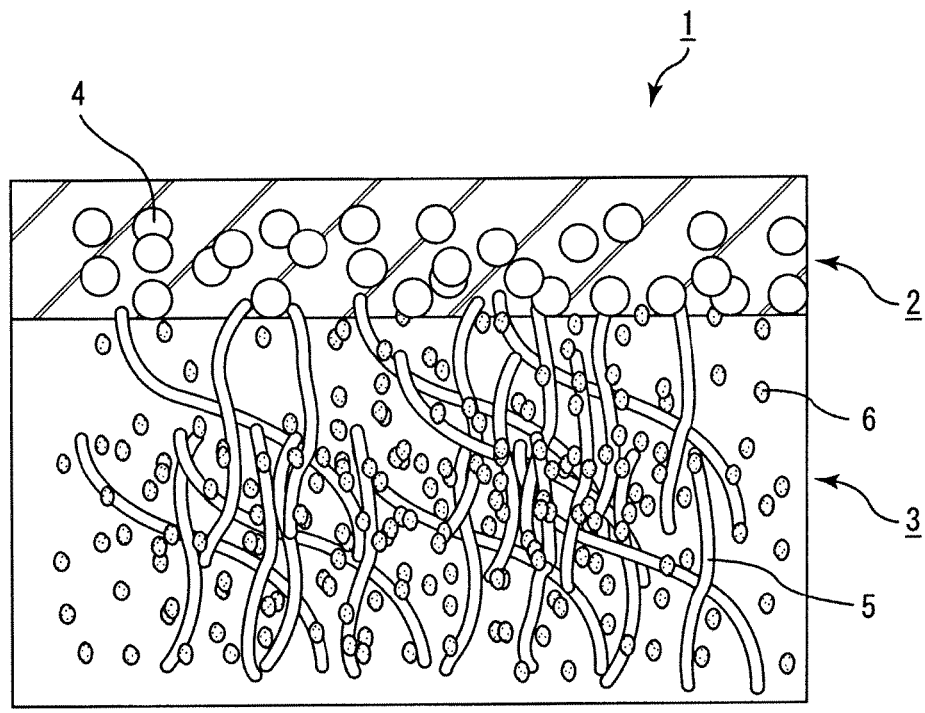
FIG. 1 is a cross-sectional view that schematically shows a portion of a cross-section obtained by cutting a conventional inorganic fiber article in the perpendicular direction to the exposed surface.
Figure 2:
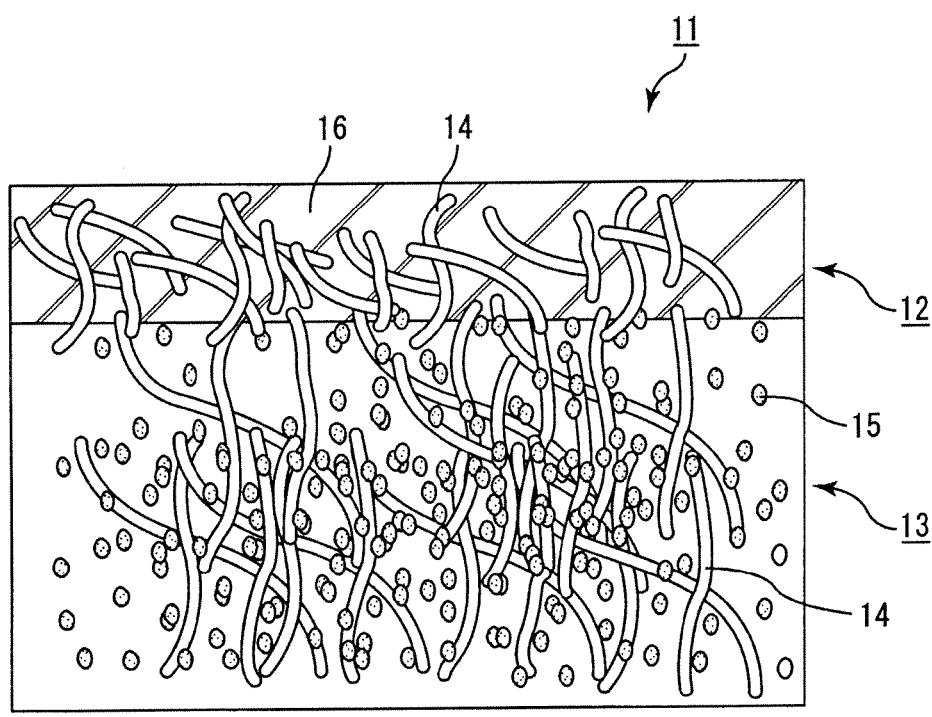
FIG. 2 is a cross-sectional view that schematically shows a portion of a cross-section obtained by cutting an inorganic fiber article according to one embodiment of the present invention in the perpendicular direction to the exposed surface.

Hereinafter, the inorganic fiber article according to the embodiments of the present invention will be described referring to the drawings.

The inorganic fiber article according to the embodiments of the present invention comprises an inorganic coating layer having foams, the inorganic coating layer formed on at least a portion of the surface of an inorganic fiber molded body.

FIG. 1 is a cross-sectional view that schematically shows a portion of a cross-section obtained by cutting an inorganic fiber article according to one embodiment of the present invention in the perpendicular direction to the exposed surface.

As shown in FIG. 1, an inorganic fiber article 1 comprises an inorganic fiber molded body 3 and an inorganic coating layer 2 which is formed on a portion of the surface of the inorganic fiber molded body 3.

The inorganic fiber molded body 3 includes at least an inorganic fiber 5, and if necessary, an inorganic powder 6 (described later) is also added thereto. It can be observed that, in the fine structure of the inorganic fiber molded body 3, inorganic fibers 5 are entangled with one another so that they can support each other, and those inorganic fibers 5 are allowed to maintain a certain shape. Moreover, if an inorganic binder is also present, the points or surfaces at which the entangled inorganic fibers 5 make contact with each other are bonded to one another so that the inorganic fibers 5 can firmly support each other, thereby more easily enhancing further the mechanical characteristics. Further, if the inorganic powder 6 is added to the inorganic fiber molded body 3, the inorganic powder 6 is resultantly included in the inorganic fibers 5 having an entangled structure, and thus radiation heat transfer and convection heat transfer maybe suppressed more easily, thereby tending to improve insulating properties.

On the other hand, the inorganic coating layer 2 forms a film which is excellent in adhesive properties to the inorganic fiber molded body 3 and further has a large number of foams 4 inside the layer. With the arrangement in which the inorganic coating layer 2 and the inorganic fiber which exist within a predetermined thickness at the outermost surface of the inorganic fiber molded body 3 are made to stick firmly to each other or are fused to one another, the inorganic coating layer 2 is allowed to stick firmly to the outermost surface of the inorganic fiber molded body 3.

At the interface between the inorganic coating layer 2 and the inorganic fiber molded body 3, the inorganic fiber 5 forming the inorganic fiber molded body 3 does not substantially exist inside the inorganic coating layer 2; even if the inorganic fiber 5 does exist inside the inorganic coating layer 2 and forms an inorganic fiber ingressing layer, the proportion of the inorganic fiber ingressing layer to the thickness of the inorganic coating layer 2 is extremely small. Generally, the ingressing layer has a thickness of about 100 μm or less. Consequently, the proportion of the inorganic fiber 5 forming the inorganic molded body 3 existing in the inorganic coating layer 2 is extremely small even though the adhesive properties between the inorganic fiber molded body 3 and the inorganic coating layer 2 are maintained; thus, particle generation from the inorganic fiber existing in the glass layers of conventional inorganic fiber articles tends to be effectively prevented from occurring.

The proportion of the thickness of the inorganic fiber ingressing layer with respect to the inorganic coating layer 2 is normally about 20% or less.

Although the inorganic coating layer 2 may be formed on at least a portion of the surface of the inorganic fiber molded body, desirably, the inorganic coating layer 2 is formed on the entire surface of one of the faces forming the outer shape of the inorganic fiber molded body 3. When the entire surface of one of the faces forming the outer shape of the inorganic fiber article 1 is covered with the inorganic coating layer 2, it becomes possible to cover the entire surface of a object to be insulated such as furnaces by combining a plurality of inorganic fiber articles according to the embodiments of the present invention, even if one inorganic fiber article according to the embodiments of the present invention can not cover the surface of the object to be insulated. Further, by covering all the faces forming the outer shape of the inorganic fiber article 1 with the inorganic coating layer 2, it may become easier to realize a higher particle generation preventing performance. By thus changing the configuration of the inorganic coating layer 2 according to the required insulating ability and particle generation preventing performance, the inorganic fiber article 1 of the present invention may respond to various requirements more easily, and in addition, the production efficiency tends to be improved, thereby realizing cost reduction more easily.

With respect to the thickness of the inorganic coating layer 2, although not particularly limited, the upper limit of the thickness is desirably about 5 mm, more desirably about 3 mm, while the lower limit of the thickness is desirably about 0.4 mm, and more desirably about 0.7 mm.

The thickness of the inorganic coating layer 2 within the above-mentioned range tends to improve the heat insulation properties and maintain a preferred strength, thereby more easily preventing cracks and the like. In addition, the forming procedures of the layer tend to be simple, and technical difficulties tend not to be involved.

The inorganic coating layer 2 has foams 4, and desirably, at least a portion of these foams are closed pores.

When at least a portion of the foams are closed pores, air convection in the inorganic coating layer 2 maybe prevented more easily, and the heat insulation properties tend to be improved. Further, when the foams are open pores, there is no risk that particle generated from particle generation from the inorganic fiber molded body 3 may be discharged through the open pores to the outside of the inorganic coating layer 2, whereby it may become easier to effectively prevent particle from generating. In this inorganic coating layer 2, almost all the foams 4 are desirably closed pores.

The diameter of each of the foams is desirably about 90% or less with respect to the thickness of the inorganic coating layer, more desirably about 50% or less.

Since the diameter of the foam within the above-mentioned range tends not to increase voids in the inorganic coating layer, it may become easier to prevent the strength of the inorganic coating layer from being lowered and it may become difficult for open pores to be generated, thereby more easily preventing deterioration of heat insulation property by air convection.

More specifically, the diameter of the foam is desirably at least about 10 μm and at most about 1600 μm.

The diameter of the foam within the above-mentioned range tends to effectively prevent cracks and the like from developing in the inorganic coating layer and further improve the heat insulation property.

The diameter of the foam is, however, set to such a range within the above-mentioned range that it satisfies the condition in which the diameter of the foam is about 90% or less with respect to the thickness of the inorganic coating layer.

The ratio of the volume within which the foams occupy the inorganic coating layer is not particularly limited but desirably set to at least about 40% by volume and at most about 90% by volume.

The ratio within the above-mentioned ration tends not to increase the rate of solid heat transfer, thereby more easily preventing deterioration of the heat insulation property. Moreover, since it is difficult for open pores to be generated, it may become easier to prevent the strength of the inorganic coating layer from being lowered and for particle generation to be suppressed effectively.

It is desirable that the inorganic coating layer mainly comprises an amorphous material.

Since amorphous materials have amorphous properties, it is difficult for heat to be transferred as compared with crystalline materials; thus, excellent heat insulation property may be obtained more easily. In addition, amorphous materials can realize excellent processability, mechanical characteristics become isotropic, and it may become difficult for cracks to develop in the characteristic direction. Moreover, the respective inorganic coating layers made of amorphous materials may be more easily formed at a comparatively low temperature. Based on the above-mentioned reasons, the inorganic coating layer mainly comprising the amorphous material tends to have excellent adhesive property with respect to the inorganic fiber molded body and also have a superior heat resistance.

It is desirable that the amorphous material forming the inorganic coating layer 2 is at least one amorphous material selected from the group consisting of glass, a diamond-like carbon, a silicon oxide film, a hafnium oxide film, a chalcogenide based multi-element alloy, and an opaline material.

This is because the amorphous materials described above are excellent in heat insulation property and processability, and can easily be combined with other functional materials.

Within the above-mentioned amorphous materials, glass is desirably used from the viewpoint of its heat resistance, processability, and availability.

The following description will describe a case in which the inorganic coating layer 2 comprises glass as the amorphous material.

With respect to the glass contained in the inorganic coating layer 2, although not particularly limited, examples thereof include silica glass, aluminosilicate glass, borosilicate glass, soda lime glass, potash soda glass, and leaded potash glass. These glasses may be used alone, or may be used in combination.

The materials mainly forming the glass is for example, silica, alumina, boric acid and the like. In the inorganic coating layer, these materials in a melted state form a layer structure having amorphous properties. Further, alkali metal compound such as sodium oxide, potassium oxide, and lithium oxide, and alkaline earth metal compound such as calcium oxide, magnesium oxide, and barium oxide may be supplementarily added to the inorganic coating layer, if necessary.

The inorganic coating layer desirably contains about 30% by weight or more of silica, and has a coefficient of thermal expansion of about 6 ppm or less.

When the inorganic coating layer contains about 30% by weight or more of silica, it may become easier to form the inorganic coating layer efficiently, and also the heat insulation property tends to be improved. Moreover, the coefficient of thermal expansion of about 6 ppm or less makes it difficult to cause a large thermal stress despite the change in temperature, thereby tending to effectively prevent cracks and the like from generating even upon use of the inorganic fiber article in a severe condition at a high temperature of about 600° C. or more.

Upon considering the conditions with respect to the content of silica, an exemplary content of the respective main constituent materials of the above-mentioned glass includes at least about 30% by weight and at most about 70% by weight of silica, at least about 5% by weight and at most about 30% by weight of alumina, and at least about 5% by weight and at most about 25% by weight of boric acid. Further, alkali metal, alkaline earth metal, and other unavoidable impurities and the like are also contained in the glass as residual materials other than the main constituent materials. The respective constituent materials included within the above-mentioned range may more easily form an inorganic coating layer superior in durability, heat resistance, heat insulation property, mechanical strength and the like, on the surface of the inorganic fiber molded body.

The inorganic coating layer desirably contains at least one crystalline material selected from the group consisting of carbide crystals, nitride crystals, oxide crystals, and carbon crystals.

When heated at a high temperature (for example, at about 1000° C.) the crystalline material reacts with the oxygen in the inorganic coating layer mainly composed of glass and the like, and generates gases such as carbon dioxide. In other words, at a melting temperature of the amorphous material upon forming the inorganic coating layer, the above-mentioned crystalline material easily generates gases so that it may more easily function as a foaming agent for forming foams. As described above, there exist foams formed by the foaming function of the crystalline material in the inorganic coating layer such that the inorganic coating layer is allowed to have a dividing structure divided by closed pores. This dividing structure allows slowing down the development of cracks and the like, even if cracks are generated, and tends to effectively prevent the cracks and the like from extending over the entire inorganic coating layer.

With respect to the above-mentioned carbide crystals, examples thereof include carbide crystals such as silicon carbide, titanium carbide, iron carbide, vanadium carbide, chromium carbide, and molybdenum carbide.

With respect to the nitride crystals, examples thereof include nitride crystals such as silicon nitride, aluminum nitride, boron nitride, copper nitride, iron nitride, gallium nitride, molybdenum nitride, tungsten nitride, lithium nitride, and magnesium nitride.

With respect to the oxide crystals, examples thereof include oxides such as $PbO$, $BaCO_3$, and $CaCO_3$.

With respect to the carbon crystals, examples thereof include graphite and the like.

The inorganic coating layer including such crystalline materials tends to enable foams to be formed effectively.

While the above-mentioned crystalline materials tend to effectively function as a foaming agent for forming foams in the inorganic coating layer, a portion of the materials remain in the inorganic coating layer. These remainder materials may more easily function as a filler and improve the strength of the inorganic coating layer. With respect to this point as well, the crystalline material as described above is desirably used. The above-mentioned crystalline material also tends to function effectively with respect to the function of preventing cracks and the like from extending through the inorganic coating layer. Here, the crystalline material does not necessarily remain in the inorganic coating layer.

The content of crystalline materials in the inorganic coating layer is not particularly limited; however, when the inorganic coating layer mainly comprises the amorphous material, the content of crystalline material is desirably at least about 10 parts by weight and at most about 30 parts by weight with respect to 100 parts by weight of amorphous material.

Since the content of the crystalline materials within the above-mentioned range is likely to appropriately maintain the amount of foams formed in the inorganic coating layer, the heat resistance property and crack resistance property tend to be improved. Moreover, since the existing rate of open pores tends to be prevented from becoming high, particle generation tends to be prevented effectively.

Here, the upper limit of the average particle diameter of the crystalline materials contained in the inorganic coating layer is desirably about 100 μm, more desirably about 30 μm, while the lower limit thereof is desirably about 5 μm, and more desirably about 10 μm.

The average particle diameter of the crystalline material is correlative with the diameter of the foam as well as the weight of the crystalline materials. That is, the average particle diameter and the amount of the crystalline materials to be added as the foaming agent is determined according to the required diameter of the foam. The average particle diameter of the crystalline materials within the above-mentioned range tends to appropriately maintain the diameter of the foam, and therefore, the handling of the powder may become easier.

Among the crystalline materials described above, particularly, carbide crystals and carbon crystals are desirably used.

These materials are more likely to efficiently generate carbon dioxide through reactions with oxygen at a high temperature, and thus tend to be effectively used upon forming foams in the inorganic coating layer.

Further, silicon carbide is more desirably used among the carbide crystals.

This is because silicon carbide is rich in reactivity with oxygen at a high temperature so that it may more easily generate carbon dioxide, thereby tending to efficiently form foams, as a foaming agent.

Further, since silicon carbide is a conductive material, the inorganic coating layer containing the silicon carbide tends to lower the volume resistance of the inorganic coating layer at a high temperature by one digit. Therefore, the inorganic coating layer containing silicon carbide is more likely to effectively prevent dust and particles in the atmosphere by an electrostatic effect from adhering and to maintain the use environment in a clean condition.

A water permeability from the outwardly-exposed surface side to the inorganic fiber molded body side of the inorganic coating layer is desirably about 1% or less.

The water permeability within the above-mentioned range tends to keep the rate of the open pores in the inorganic coating layer to a low rate, thereby tending to effectively prevent particle generation in the inorganic fiber article.

Next, the inorganic fiber molded body 3 will be described.

Examples of the inorganic fiber 5 forming the inorganic fiber molded body 3 include a silica-alumina fiber, an alumina fiber, a silica fiber, a zirconia fiber, a glass fiber, a potassium titanate whisker fiber, and a rock wool, or an inorganic fiber that contains any of the aforementioned inorganic fibers in addition to at least one compound selected from the group consisting of an alkali metal compound, an alkaline earth compound and a boron compound. The use of these inorganic fibers is desirable in view of heat resistance, strength and availability. The above-mentioned inorganic fibers may be used alone or two or more kinds thereof may be used in combination.

Among the above-mentioned inorganic fibers, particularly silica-alumina fiber is desirably used from the viewpoint of heat resistance and handling characteristics.

The content of alkaline metal compound and the like in the above-mentioned inorganic fibers containing alkali metal compound is desirably at least about 15% by weight and at most about 40% by weight. Such inorganic fibers tend to show appropriate solubility to saline solution so that even when they are released to the atmosphere they are more likely to be safe to the environment and ecosystem.

The cross-sectional shape of the inorganic fiber is not particularly limited and examples thereof include a circular cross-section, flat cross-section, hollow cross-section, polygonal cross-section and sheath-core cross-section. Because deformed cross-section fiber having a hollow cross-section, flat cross-section or polygonal cross-section among these sections is more likely to be increased in opportunities to reflect radiation heat transfer in heat transfer and also slightly improved in heat insulation property, it tends to be preferably used.

The lower limit of the average fiber length of the inorganic fiber is desirably about 0.1 mm and more desirably about 0.5 mm. On the other hand, the upper limit of the average fiber length of the inorganic fiber is desirably about 50 mm and more desirably about 10 mm.

When the average fiber length of the inorganic fiber is within thee above-mentioned range, entanglements among inorganic fibers may be caused more easily, and therefore, the mechanical strength of the obtained inorganic fiber molded body tends to be improved. Further, inorganic fibers are tightly entangled with each other and continuous voids tend not to be easily generated, leading to an improvement in the heat insulation property.

The lower limit of the average fiber diameter of the inorganic fiber is desirably about 1 μm and more desirably about 2 μm. On the other hand, the upper limit of the average fiber diameter of the inorganic fiber is desirably about 10 μm and more desirably about 5 μm.

This is because when the average fiber diameter of the inorganic fiber is within the above-mentioned range, the mechanical strength of the inorganic fiber itself tends to be improved. Moreover, since solid heat transfer through the inorganic fiber as a medium tends to be lowered, the heat insulation property is more likely to be improved.

The inorganic fiber molded body 3 desirably further contains the inorganic powder 6.

The inorganic fiber molded body forming the inorganic fiber article according to the embodiments of the present invention should contain at least an inorganic fiber. The use of such inorganic fiber molded body tends to allow the inorganic fiber article of the present invention to exert its effect as an inorganic fiber article; however, it is desirable that the inorganic fiber molded body further contain the inorganic powder 6.

If the inorganic fiber molded body further contains the inorganic powder, radiation heat transfer is more likely to be suppressed efficiently. Also, the continuous voids in the structure that are caused by entanglement of the inorganic fibers tend to be divided, and it may therefore become easier to also reduce convection heat transfer in the inorganic fiber molded body effectively.

Examples of the inorganic powder include a $TiO_2$ powder, a $BaTiO_3$ powder, a PbS powder, a $SiO_2$ powder, a $ZrO_2$ powder, a SiC powder, a NaF powder and a LiF powder. These inorganic powders may be used alone or two or more kinds thereof may be used in combination.

When the inorganic powders are used in combination, preferable examples of the combinations include a combination of a $TiO_2$ powder and a $SiO_2$ powder, a combination of a $TiO_2$ powder and a $BaTiO_3$ powder, a combination of a $SiO_2$ powder and a $BaTiO_3$ powder, and a combination of a $TiO_2$ powder, a $SiO_2$ powder and a $BaTiO_3$ powder.

As to the compounding amount of the inorganic fiber, the upper limit thereof is desirably about 50% by weight and more desirably about 40% by weight based on the total weight of the materials forming the inorganic fiber molded body. On the other hand, the lower limit of the compounding amount of the inorganic fiber is desirably about 5% by weight and more desirably about 10% by weight.

When the compounding amount of the inorganic fiber is within the above-mentioned range, the reinforcing effect produced by the inorganic fiber tends to be improved, whereby the handling characteristics and mechanical strength of the inorganic fiber molded body or inorganic fiber article may be improved more easily. Further, continuous voids tend not to be generated in the structure in which the inorganic fibers forming the inorganic fiber molded body are entangled, more easily suppressing an increase in convection heat transfer, molecular heat transfer and radiation heat transfer, with the result that heat insulation property tends to be improved.

As to the compounding amount of the inorganic powder, the upper limit thereof is desirably about 95% by weight and more desirably about 90% by weight based on the total weight of the materials forming the inorganic fiber molded body. On the other hand, the lower limit of the compounding amount of the inorganic powder is desirably about 50% by weight and more desirably about 60% by weight.

When the compounding amount of the inorganic powder is within the above-mentioned range, radiation heat transfer is more likely to be reduced while more easily retaining the reinforcing effect of the inorganic fiber. Also, the effect of decreasing convection heat transfer which is obtained by dividing continuous voids in a confounded structure of the inorganic fiber may be obtained more easily.

The lower limit of the average particle diameter of the inorganic powder is desirably about 0.5 μm and more desirably about 1 μm. On the other hand, the upper limit of the average particle diameter of the inorganic powder is desirably about 20 μm and more desirably about 10 μm.

When the average particle diameter of the inorganic powder is within the above-mentioned range, it may become easier to manufacture the inorganic fiber molded body. Moreover, since it is possible for radiation heat to be sufficiently distributed and the thermal conductivity of the inorganic fiber molded body tends to be prevented from increasing, the heat insulation property is more likely to be improved. Further, since voids may be kept to an appropriate size more easily, an increase in convection heat transfer and molecular heat transfer tends to prevent the thermal conductivity from rising, resulting in an improvement in the heat insulation property.

The shape of the inorganic powder is not particularly limited as long as the average particle diameter is within the above-mentioned range. Examples of the shape include desired shapes such as a spherical shape, ellipsoidal shape, polygonal shape, shapes having irregularities or projections formed on the surface thereof and deformed shapes.

Also, the inorganic powder desirably has a ratio of refractive index (specific refractive index) of about 1.25 or more for light having a wavelength of about 1 μm or more.

The inorganic powder plays a very important role as a radiation heat diffusing material. As the refractive index increases, radiation heat tends to be diffused more efficiently. As to the specific refractive index, it is very important to limit the conduction of phonons. The larger this value is, the better the effect of limiting phonon conduction tends to be. Therefore, in the embodiments of the present invention, the value of the specific refractive index of the inorganic powder is desirably about 1.25 or more.

Here, to add a little more description concerning the limitation to phonon conduction, materials having lattice defects in a crystal or materials having a complicated structure are generally known as the material that may limit phonon conduction more easily. The aforementioned $TiO_2$, $SiO_2$ and $BaTiO_3$ tend to have lattice defects and have a complicated structure and it is therefore considered that they are effective to diffuse not only radiation heat but also phonons.

Moreover, an inorganic powder having a reflectance of about 70% or more for light having a wavelength of about 10 μm or more tends to be preferably used as the inorganic powder. The light having a wavelength of about 10 μm or more is light in the so-called infrared to far-infrared wavelength range. Radiation heat transfer is more likely to be reduced more efficiently if the reflectance for light in the above wavelength range is about 70% or more.

The solid heat conductivity of the inorganic powder is desirably about 20.9 W/mK or less at room temperature.

If a solid heat conductivity at room temperature is within the above-mentioned range, the effect of solid heat transfer in the heat insulating material is lowered and the rise of the thermal conductivity may be suppressed more easily, whereby heat insulation property tends to be improved.

Here, the inorganic fiber in this specification refers to an inorganic fiber having an aspect ratio of about 3 or more. On the other hand, the inorganic powder refers to an inorganic powder having an aspect ratio of less than about 3. In this case, the aspect ratio is the ratio (b/a) of the major diameter (b) to minor diameter (a) of a material.

Also, the inorganic fiber molded body may contain an inorganic binder with the intention of maintaining strength at high temperatures. Examples of the inorganic binder include colloidal silica, synthetic mica and montmorillonite. The above-mentioned inorganic binders may be used alone or two or more kinds thereof may be used in combination.

This inorganic binder may be used more easily, according to the need, in an amount of at least about 1% by weight and at most about 10% by weight based on the total weight of the constituent materials of the inorganic fiber molded body: however, a lesser amount of the inorganic binder is more preferably used. As a mode of use of the above-mentioned inorganic binder, the binder may be used more easily by blending it in raw materials or by impregnating the obtained inorganic fiber article therewith.

The inorganic fiber molded body forming the inorganic fiber article according to the embodiments of the present invention is a molded body obtained by molding inorganic fiber and the like into a desired shape by a dry molding method or a wet molding method. A method for manufacturing the inorganic fiber molded body will be described later.

The shape of the inorganic fiber molded body is not particularly limited, and examples thereof include arbitrary shape such as a plate shape, a disk shape, a cube shape, a rectangular parallelepiped shape, a cylindrical shape, a doughnut type shape and a spherical shape.

The thickness of the inorganic fiber molded body is not particularly limited, and when the inorganic fiber molded body has a plate shape, the thickness thereof is desirably at least about 2 mm and at most about 200 mm.

When the thickness of the inorganic fiber molded body is within the above-mentioned range, it may be come easier to impart sufficient heat insulation property and mechanical strength to the inorganic fiber article. Further, molding of the inorganic fiber molded body itself tends to be easy.

Although not particularly limited, the bulk density of the inorganic fiber molded body is desirably at least about 0.20 g/cm$^3$ and at most about 0.50 g/cm$^3$. The bulk density may be found as a value obtained by dividing the weight by the apparent volume (see JIS A0202).

When the bulk density is within the above-mentioned range, by suppressing an increase in convection heat transfer and molecular heat transfer, thermal conductivity is more likely to be prevented from rising, thereby tending to improve the heat insulation property.

The contents of JIS A 0202 are incorporated herein by reference in its entirety.

The inorganic fiber article 1 comprising such an inorganic fiber molded body 3 and the inorganic coating layer 2 formed on at least a portion of the surface of the inorganic fiber molded body desirably has a thermal conductivity of about 0.25 W/mK or less at a temperature of about 800° C.

The thermal conductivity of about 0.25 W/mK or less is more likely to improve the durability of the furnace so that the cost and time required for maintenance of the furnace may be cut off more easily.

The inorganic fiber article 1 is desirably resistant to heat at a temperature of about 600° C. or more, and more desirably resistant to about 900° C. or more.

The heat resistance within the above-mentioned range expands the application of the inorganic fiber article, whereby the limitation is preferable with respect to the utility of the inorganic fiber article.

When the inorganic fiber article has a plate shape, the exemplary thickness of the inorganic fiber article is at least about 10 mm and at most about 200 mm.

The inorganic fiber article having a thickness within the above-mentioned range tends to improve the heat insulation property. Further, the strength may be enhanced more easily, resulting in difficulty in causing damages such as cracks. Moreover, the inorganic fiber article may be manufactured more easily because a better moldability is likely to be obtained.

With respect to the inorganic fiber article according to the embodiments of the present invention, an inorganic coating layer having foams is formed with good adhesion to at least a portion of the surface of an inorganic fiber molded body. Thus, particle generation from the inorganic fiber molded body tends to be effectively suppressed, and thereby the inorganic fiber article are more likely to be advantageously used even under environments in which particle generation is unfavorable. Further, safeness on the living body tends to be enhanced.

Further, the inorganic fiber article according to the embodiments of the present invention comprises an inorganic coating layer having foams and the inorganic coating layer itself has a high heat insulation property; therefore, the heat insulation property of the inorganic fiber article together with the heat insulation property of the inorganic fiber molded body tends to be synergistically improved so that the inorganic fiber article can be applied to various purposes such as heat insulating materials.

In the inorganic fiber article according to the embodiments of the present invention, an inorganic coating layer is formed on the surface of the inorganic fiber molded body; thus, the strength thereof is greater than that of a article formed only by the inorganic fiber molded body. Therefore, cracks and the like tend to be prevented from generating, thereby more easily suppressing damages and the like to the inorganic fiber article itself. In addition, even if cracks and the like are generated in the inorganic coating layer, the dividing structure by the foams tends to slow down the development of the generated cracks and the like so that cracks and the like may be more easily prevented from generating in the entire inorganic coating layer. Thus, the durability of the inorganic fiber article is more likely to be improved and particle generation tends to be suppressed effectively.

Next, the following description will discuss the method for manufacturing the inorganic fiber article according to the embodiments of the present invention.

The inorganic fiber article according to the embodiments of the present invention comprises an inorganic fiber molded body and an inorganic coating layer formed on at least a portion of the surface of the inorganic fiber molded body; therefore, the inorganic fiber molded body is manufactured at first and then the inorganic coating layer is formed on the surface thereof.

(a) In Case of Using an Inorganic Fiber Molded Body Obtained by a Dry Molding Method First, in a dry molding method, the inorganic fiber, and according to the need, the inorganic powder and the inorganic binder are charged at a predetermined ratio into a mixer such as a V-type mixer. These components are mixed well and charged into a predetermined die to be pressed, thereby obtaining an inorganic fiber molded body. At the time of pressing of the mixture, heat may be applied to the mixture according to need.

The inorganic fiber molded body normally has a plate shape, but the shape thereof is not limited to the plate shape and may be a shape in which a number of plate shaped members are perpendicularly superposed on one another.

The pressure for pressing is desirably at least about 0.98 MPa and at most about 9.8 MPa. When the pressing pressure is within the above-mentioned range, the obtained inorganic fiber molded body may maintain its strength more easily. In addition, excess compression also tends to cause improved processability, and also, the bulk density tends to be prevented from becoming high, so that it may become difficult for solid heat transfer to be increased, more easily bringing about enhanced heat insulation property.

Also, the heating temperature during pressing is desirably at least about 400° C. and at most about 700° C. When the heating temperature is in this range, sufficient heat insulation property is more likely to be maintained while retaining a proper processability.

(b) In Case of Using an Inorganic Fiber Molded Body Obtained by a Wet Molding Method Next, in a wet molding method, the inorganic fiber, and according to the need, the inorganic powder and the inorganic binder are mixed and stirred in water to fully disperse these components. Then, an aqueous aluminum sulfate solution and the like are added as a flocculant to the mixture, to obtain a primary aggregate made of the inorganic fiber with the inorganic powder and inorganic binder adhered a long its surface. Next, according to need, an emulsion or the like of the organic elastic material are added in the water in an amount falling in a predetermined range, and then, a cationic polymer flocculant is added to the mixture to obtain a slurry (suspension liquid) containing an aggregate.

Next, the slurry (suspension liquid) containing the aggregate is formed into a sheet by using a mesh-like member (mesh), a so-called sheet-forming process is carried out, to obtain a sheet-formed body having a plate shape. After the sheet-forming process, the entire sheet-formed body may be pressed to raise the density of the sheet-formed body. Then, the obtained sheet-formed body is dried to obtain an inorganic fiber molded body.

Next, a powder which serves as raw material of the inorganic coating layer, such as a glass powder which is prepared by pulverizing the glass having the composition as described above, is dispersed in water, and subsequently a powder of at least one crystalline material selected from the group consisting of carbide crystals, nitride crystals, oxide crystals, and carbon crystals is added thereto and dispersed to prepare an inorganic coating layer forming slurry.

By dipping (immersing) the inorganic fiber molded body into the inorganic coating layer forming slurry thus prepared, a slurry powder layer is formed on a portion of the surface of the inorganic fiber molded body. Here, by dipping in a portion of or all the surface of the inorganic fiber molded body, the slurry powder layer may be formed at any surface more easily. In order to adjust the thickness of the slurry powder layer, the dipping time and the number of rounds of dipping into the slurry can be adjusted.

As for methods other than dipping, a method of carrying out curtain coating to form the slurry powder layer, a method of carrying out spray coating and the like can be proposed.

When applying the curtain coating method, on the inorganic fiber molded body which is translated at a constant speed, the inorganic coating layer forming slurry is dropped through a slit having a predetermined width in a curtain-like form (film-like form) to form the slurry powder layer. In order to adjust the thickness of the slurry powder layer, the translation speed of the inorganic fiber molded body may be adjusted or the dropping speed of the slurry may be adjusted.

Further, in the spray coating, the inorganic coating layer forming slurry is sprayed onto the surface of the inorganic fiber molded body by using sprays having a predetermined shape, such as a spray nozzle, to form the slurry powder layer. In order to adjust the thickness of the slurry powder layer, the diameter and spraying amount of the slurry droplet, the translation speed of the spray and the like may be adjusted.

Then, the slurry powder layer which is formed on the surface of the inorganic fiber molded body is dried, and heated at a predetermined temperature so that the crystalline material is formed into foams and the amorphous material is melted in addition, to form the inorganic coating layer.

Generally, the upper limit of the heating temperature of the glass material is desirably about 1400° C., more desirably about 1300° C., whereas the lower limit is desirably about 1000° C., and more desirably about 1100° C. The heating temperature within the above-mentioned range tends to allow efficient forming of an inorganic coating layer having desired physical properties. Normally, the layer in a melting state which is to become an inorganic coating layer merely penetrates into the inorganic fiber molded body; thus, an inorganic coating layer having a certain degree of adhesion strength to the inorganic fiber molded body and hardly contains inorganic fibers therein tends to be formed more easily.

In order to adjust the diameter of the foams, the average particle diameter of the crystalline material used as raw material maybe adjusted, or the heating temperature and heating time upon forming foams may be adjusted.

EXAMPLES

The embodiments of the present invention will be described in more detail by way of examples, which are not intended to be limiting of the present invention.

Example 1

(1) A so-called shot-reduced bulk material (trade name: IBI-Wool, manufactured by Ibiden Co., Ltd.) (97 parts by weight) prepared by removing coarse particles from silica-alumina based ceramic fiber as inorganic fiber forming an inorganic fiber molded body is added in a necessary amount of water to loosen the fibers. Then, 3 parts by weight of colloidal silica (trade name: SNOWTEX, manufactured by Nissan Chemical Industries Ltd.) is further added as an inorganic binder to the mixture, which is then thoroughly stirred and mixed. An aqueous aluminum sulfate is further added as a flocculant to the mixture to obtain a primary aggregate. Then, a cationic polymer flocculant is added to the mixture to once again flocculate the primary aggregate so that a slurry is obtained.

(2) Next, the slurry is formed into a sheet by a mesh (mesh-like member) while being sufficiently stirred and the obtained laminated body is lightly pressed and then dried at 135° C. to obtain a plate-shaped inorganic fiber molded body having a thickness of 20 mm and which is 600 mm long×900 mm in width.

(3) Then, a glass containing 8.6% by weight of $B_2O_3$, 1.2% by weight of $Na_2O$, 0.6% by weight of MgO, 10.2% by weight of $Al_2O_3$, 63.7% by weight of $SiO_2$, 4.8% by weight of $K_2O$, 8.8% by weight of CaO, and 2.1% by weight of other unavoidable impurities is pulverized to glass powder having an average particle diameter of 10 µm, and 100 parts by weight of this glass powder is dispersed in a necessary amount of water. Subsequently, 30 parts by weight of SiC powder (manufactured by Shinano Electric Refining Co., Ltd.) having an average particle diameter of 13 µm is added to the mixture and thoroughly mixed so that a suspension is obtained.

(4) Next, the position of the main surface of the inorganic fiber molded body is determined above the suspension liquid such that the main surface is faced parallel to the surface of the suspension liquid, and in that state the inorganic fiber molded body is gradually made to descend to a degree in which one main surface completely contacts the suspension liquid. Then, the one main surface is immersed in the suspension liquid and pulled out thereafter so that a layer of glass powder containing SiC powder is formed on the one surface of the inorganic fiber molded body.

(5) Then, the inorganic fiber molded body on which the layer of glass powder is formed is charged into a furnace in ambient atmosphere or an atmosphere containing oxygen, and then gradually heated at a maximum temperature of 1250° C. for 20 minutes to form an inorganic coating layer (hereinafter, also referred to as a foam glass layer) on the surface of the inorganic fiber molded body. The inorganic coating layer is presumably gray in color from an empirical viewpoint.

The composition and average particle diameter of the glass powder and SiC powder together with the estimate value of the weight and thickness of the formed foam glass layer are as shown in Table 1.

Example 2

The same processes as in Example 1 are conducted with respect to processes (1) and (2).

Process (3) is carried out as in Example 1 except that the average particle diameter of the SiC powder, and the ratios of the glass powder and SiC powder are set to the values shown in Table 1.

Next, as process (4), a layer of the glass powder containing SiC powder is formed using the curtain coating method. That is, the suspension liquid of the glass powder prepared in process (3) and which contains SiC powder, is dropped through a slit in a curtain-like form and the inorganic fiber molded body in a horizontal state is passed through the dropped liquid to form a layer of the glass powder containing SiC powder on the one main surface of the inorganic fiber molded body.

Thereafter, an inorganic coating layer (foam glass layer) is formed on the surface of the inorganic fiber molded body as in process (5) of Example 1.

Example 3

The same processes as in Example 1 are conducted with respect to processes (1) and (2).

Process (3) is carried out as in Example 1 except that carbon powder is used instead of SiC powder, and the average particle diameter of the carbon powder, and the ratios of the glass powder and carbon powder are set to the values shown in Table 1.

Next, as process (4), a layer of the glass powder containing carbon powder is formed using the curtain coating method. That is, the suspension liquid of the glass powder prepared in process (3) and which contains carbon powder, is dropped through a slit in a curtain-like form and the inorganic fiber molded body in a horizontal state is passed through the dropped liquid to form a layer of the glass powder containing carbon powder on the one main surface of the inorganic fiber molded body.

Thereafter, an inorganic coating layer (foam glass layer) is formed on the surface of the inorganic fiber molded body as in process (5) of Example 1.

Example 4

The same processes as in Example 1 are conducted with respect to processes (1) and (2).

Process (3) is carried out as in Example 1 except that the average particle diameter of the SiC powder, and the ratios of the glass powder and SiC powder are set to the values shown in Table 1.

Next, as process (4), a layer of the glass powder containing SiC powder is formed using a spraying method.

That is, the suspension liquid of the glass powder prepared in process (3) and which contains SiC powder, is sprayed from a flat-type spray nozzle to evenly adhere the glass powder containing SiC powder to the one main surface of the inorganic fiber molded body so that a layer of the glass powder containing SiC powder is formed.

Thereafter, an inorganic coating layer (foam glass layer) is formed on the surface of the inorganic fiber molded body as in process (5) of Example 1.

Example 5

(1) A so-called shot-reduced bulk material (trade name: IBI-Wool, manufactured by Ibiden Co., Ltd.) (24 parts by weight) prepared by removing coarse particles from silica-alumina based ceramic fiber as inorganic fiber forming an inorganic fiber molded body is added in a necessary amount of water to loosen the fibers.

Next, 24 parts by weight of a $TiO_2$ powder (trade name: HT0100, manufactured by Toho Titanium Co., Ltd.) and 49 parts by weight of a $SiO_2$ powder (trade name: AEROSIL 90, manufactured by NIPPON AEROSIL CO., LTD.) are added as an inorganic powder of the inorganic fiber molded body to the mixture, which is then sufficiently mixed. Then, 3 parts by weight of colloidal silica (trade name: SNOWTEX, manufactured by Nissan Chemical Industries Ltd.) is further added as an inorganic binder to the mixture, which is then thoroughly stirred and mixed. An aqueous aluminum sulfate is further added as a flocculant to the mixture, to obtain a primary aggregate. Then, a cationic polymer flocculant is added to the mixture to once again flocculate the primary aggregate so that a slurry is prepared.

Processes (2) to (5) are carried out as in Example 2 except that the average particle diameter of the SiC powder, and the ratios of the glass powder and SiC powder are set to the values shown in Table 1; and thus an inorganic coating layer (foam glass layer) is formed on the surface of the inorganic fiber molded body.

Example 6

The same processes as Example 5 are carried out except that processes (2) to (5) are carried out using carbon powder instead of SiC powder, and the average particle diameter of the carbon powder, and the ratios of the glass powder and carbon powder are set to the values shown in Table 1; thus, an inorganic coating layer (foam glass layer) is formed on the surface of the inorganic fiber molded body.

Examples 7 and 8

The same processes (1) to (5) as in Example 1 are carried out to form an inorganic coating layer (foam glass layer) on the surface of the inorganic fiber molded body except that 97 parts by weight of inorganic fiber formed of 75% by weight of silica and 25% by weight of magnesium oxide and having an average fiber diameter of 3 μm and an average fiber length of 30 μm is used to prepare the slurry, instead of the shot-reduced bulk material (trade name: IBI-Wool, manufactured by Ibiden Co., Ltd.), and the ratios of the glass powder and SiC powder are set to the values shown in Table 1.

Here, the inorganic fiber formed of 75% by weight of silica and 25% by weight of magnesium oxide presumably shows as a whole a solubility of about 410 ppm to saline solution from an empirical viewpoint.

Examples 9 and 10

The same processes (1) to (5) as in Example 1 are carried out to form an inorganic coating layer (foam glass layer) on the surface of the inorganic fiber molded body except that 97 parts by weight of alumina fiber having an average fiber diameter of 3 μm and an average fiber length of 30 μm is used to prepare the slurry, instead of the shot-reduced bulk material (trade name: IBI-Wool, manufactured by Ibiden Co., Ltd.), and the ratios of the glass powder and SiC powder are set to the values shown in Table 1.

[Evaluation of Physical Property]

With respect to the glass material having almost the same major component as that of the foam glass layer obtained in the respective Examples, the materials contained in the glass material were analyzed using an X-ray diffractometer (RAD-B) manufactured by Rigaku Corporation.

Figure 3:
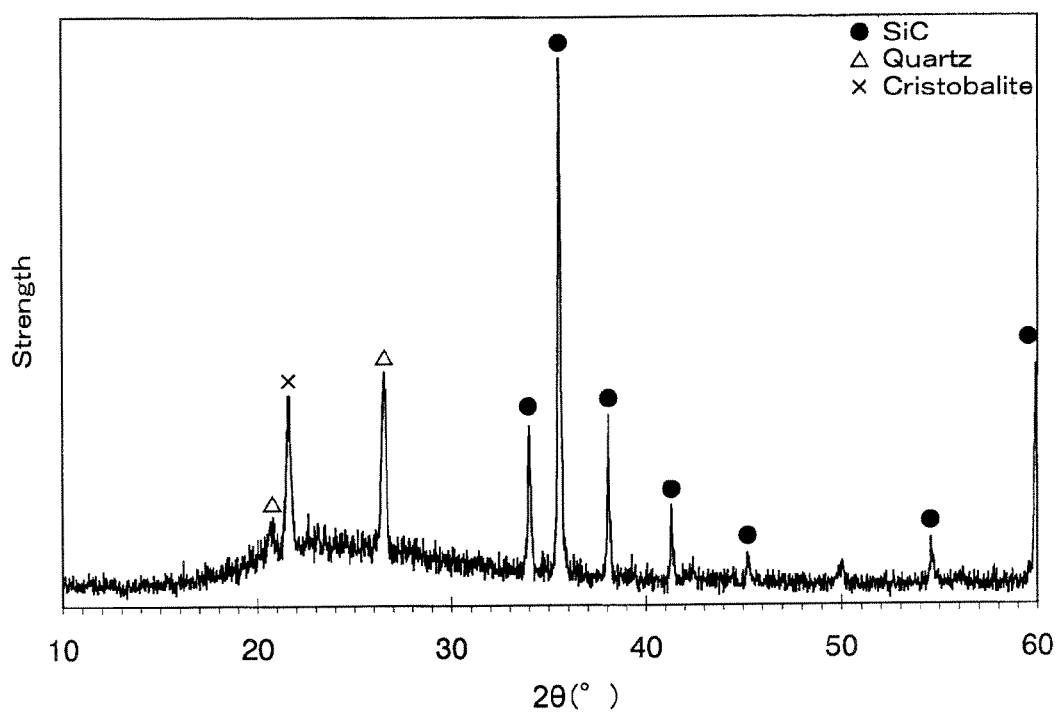
FIG. 3 is a chart indicating the results of X-ray diffraction of a glass material having almost the same composition as a foam glass layer forming the inorganic fiber article.

FIG. 3 shows a chart indicating one of the results of X-ray diffraction of the glass materials in the Examples.

TABLE 1

| | Glass powder | | SiC powder | | Foam glass layer after heating treatment | |
|---|---|---|---|---|---|---|
| | | | | | Weight | Thickness |
| | (Part by weight) | (Average particle diameter) | (Part by weight) | (Average particle diameter) | (g) | (mm) |
| Example 1 | 100 | 10 | 30 | 13 | 25 | 3 |
| Example 2 | 100 | 15 | 20 | 10 | 20 | 2.3 |
| Example 3 | 100 | 20 | (*) 10 | 13 | 20 | 2 |
| Example 4 | 100 | 10 | 30 | 20 | 52 | 4.8 |
| Example 5 | 100 | 10 | 25 | 13 | 25 | 3 |
| Example 6 | 100 | 10 | (*) 10 | 10 | 20 | 2.4 |
| Example 7 | 100 | 15 | 30 | 13 | 25 | 1.9 |
| Example 8 | 100 | 10 | 20 | 10 | 22 | 2.2 |
| Example 9 | 100 | 10 | 30 | 16 | 26 | 3.5 |
| Example 10 | 100 | 10 | 20 | 10 | 10 | 1.2 |
| Comparative Example 1 | 100 | 10 | 50 | 13 | 35 | 3.5 |
| Comparative Example 2 | 100 | 10 | 50 | 13 | 34 | 3.2 |
| Comparative Example 3 | 100 | 10 | 5 | 13 | 10 | 0.6 |
| Comparative Example 4 | 100 | 10 | 2 | 13 | 10 | 0.5 |
| Comparative Example 5 | 100 | 10 | 0 | — | 15 | 0.8 |

(*) Examples 3 and 6 use carbon powder instead of SiC powder.

The inorganic fiber articles obtained in the Examples tend to be superior in insulating ability, tend neither to generate particles nor to allow water to pass through, and tend to have resistance to thermal shock. Moreover, since the glass material on which an X-ray diffraction measurement was carried out has almost the same major component as that of an inorganic coating layer (foam glass layer) obtained in the Examples, the inorganic coating layer (foam glass layer) obtained in the Examples presumably shows the same chart as the chart shown in FIG. 3.

What is claimed as new and desired to be secured by Letters Patent of the United States is:

1. An inorganic fiber article comprising:
an inorganic fiber molded body; and
an inorganic coating layer having foam pores, the foam pores occupying at least about 40% by volume and at most about 90% by volume in the inorganic coating layer,
wherein the inorganic coating layer including an amorphous material and at least one crystalline material is formed on a surface of the inorganic fiber molded body such that the inorganic fiber molded body includes inorganic fibers fused into the inorganic coating layer at the surface of the inorganic fiber molded body, the at least one crystalline material has an amount of between 10 parts by weight and 30 parts by weight with respect to 100 parts by weight of the amorphous material, and the entire surface of the inorganic fiber molded body is completely covered with the inorganic coating layer such that the inorganic coating layer forms an outer shape of the inorganic fiber molded body.

2. The inorganic fiber article according to claim 1, wherein said inorganic coating layer mainly comprises the amorphous material.

3. The inorganic fiber article according to claim 2, wherein said amorphous material is selected from the group consisting of glass, a diamond-like carbon, a silicon oxide film, a hafnium oxide film, a chalcogenide based multi-element alloy, an opaline material and a combination thereof.

4. The inorganic fiber article according to claim 2, wherein said amorphous material is glass.

5. The inorganic fiber article according to claim 1, wherein said at least one crystalline material comprises selected from the group consisting of carbide crystals, nitride crystals, oxide crystals, and carbon crystals and a combination thereof.

6. The inorganic fiber article according to claim 5, wherein said crystalline material is carbide crystals or carbon crystals.

7. The inorganic fiber article according to claim 6, wherein said carbide crystals are silicon carbide, titanium carbide, iron carbide, vanadium carbide, chromium carbide, or molybdenum carbide.

8. The inorganic fiber article according to claim 1, wherein at least a portion of said foams are closed pores.

9. The inorganic fiber article according to claim 1, wherein a water permeability from an outwardly-exposed surface side to an inorganic fiber molded body side of said inorganic coating layer is about 1% or less.

10. The inorganic fiber article according to claim 1, wherein said inorganic coating layer has a thickness of at least about 0.4 mm and at most about 5 mm.

11. The inorganic fiber article according to claim 1, wherein the diameter of each of said foams is about 90% or less with respect to the thickness of said inorganic coating layer.

12. The inorganic fiber article according to claim 1, wherein said inorganic coating layer contains about 30% by weight or more of silica, and has a coefficient of thermal expansion of about 6 ppm or less.

13. The inorganic fiber article according to claim 1, wherein an inorganic fiber forming said inorganic fiber molded body is a silica-alumina fiber, an alumina fiber, a silica fiber, a zirconia fiber, a glass fiber, a potassium titanate whisker fiber, a rock wool, or an inorganic fiber that contains any of aforementioned inorganic fibers in addition to at least one compound selected from the group consisting of an alkali metal compound, an alkaline earth compound and a boron compound.

14. The inorganic fiber article according to claim 1, wherein said inorganic fiber molded body comprises an inorganic powder.

15. The inorganic fiber article according to claim 14, wherein said inorganic powder is a $TiO_2$ powder, a $BaTiO_3$ powder, a PbS powder, a $SiO_2$ powder, a $ZrO_2$ powder, a SiC powder, a NaF powder, a LiF powder, or a combination of two or more of these powders.

16. The inorganic fiber article according to claim 1, wherein said inorganic fiber molded body comprises an inorganic binder.

17. The inorganic fiber article according to claim 1, wherein the inorganic coating layer mainly comprises the amorphous material comprising glass, and the at least one crystalline material comprises at least one of carbide crystals and carbon crystals.

18. The inorganic fiber article according to claim 1, wherein the inorganic coating layer is formed on the surface of the inorganic fiber molded body by coating a slurry comprising the amorphous material and the at least one crystalline material over the surface of the inorganic fiber molded body and heating at a temperature in a range between 1,000° C. to 1,400° C.

19. A heat insulating material comprising the inorganic fiber article according to claim 1.

* * * * *